(12) United States Patent
Sato

(10) Patent No.: US 11,586,782 B2
(45) Date of Patent: Feb. 21, 2023

(54) GUIDE LAYOUT CREATING APPARATUS, GUIDE LAYOUT CREATING METHOD AND RECORDING MEDIUM

(71) Applicant: Kioxia Corporation, Tokyo (JP)

(72) Inventor: Hironobu Sato, Taito Tokyo (JP)

(73) Assignee: Kioxia Corporation, Tokyo (JP)

(*) Notice: Subject to any disclaimer, the term of this patent is extended or adjusted under 35 U.S.C. 154(b) by 100 days.

(21) Appl. No.: 17/322,347

(22) Filed: May 17, 2021

(65) Prior Publication Data
US 2021/0271781 A1 Sep. 2, 2021

Related U.S. Application Data

(62) Division of application No. 15/891,408, filed on Feb. 8, 2018, now Pat. No. 11,030,353.

(30) Foreign Application Priority Data

Sep. 13, 2017 (JP) .............................. JP2017-176080

(51) Int. Cl.
*G06F 30/00* (2020.01)
*H01L 23/498* (2006.01)
(Continued)

(52) U.S. Cl.
CPC ............ *G06F 30/00* (2020.01); *G03F 7/0002* (2013.01); *G03F 7/0035* (2013.01); *H01L 23/49838* (2013.01); *G06F 2119/18* (2020.01)

(58) Field of Classification Search
CPC .... G06F 30/00; G06F 2119/18; G03F 7/0002; G03F 7/0035; H01L 23/49838
(Continued)

(56) References Cited

U.S. PATENT DOCUMENTS

| 8,873,179 B1 | 10/2014 | Hirayama |
| 9,117,478 B2 | 8/2015 | Watanabe et al. |
(Continued)

FOREIGN PATENT DOCUMENTS

| JP | 2012-66536 A | 4/2012 |
| JP | 2015-53097 A | 3/2015 |
| JP | 2016-541125 A | 12/2016 |

OTHER PUBLICATIONS

Bita et al., "Graphoepitaxy of Self-Assembled Block Copolymers on Two-Dimensional Periodic Patterned Templates," Science (Aug. 15, 2008), 321:939-943.

*Primary Examiner* — Caleen O Sullivan
(74) *Attorney, Agent, or Firm* — Finnegan, Henderson, Farabow, Garrett & Dunner, LLP

(57) ABSTRACT

In one embodiment, a guide layout creating apparatus includes a selection module that selects a first point as a point on which a guide to array a plurality of particles in a first array is arranged. The apparatus further includes a calculation module that calculates first free energy when the plurality of particles are arrayed in the first array by the guide arranged on the first point, and second free energy when the plurality of particles are arrayed in a second array by the guide arranged on the first point, a type of the second array being different from a type of the first array. The apparatus further includes a determination module that determines whether the first point is employed as the point on which the guide is arranged on the basis of the first free energy and the second free energy.

9 Claims, 8 Drawing Sheets

(51) Int. Cl.
    *G03F 7/00*      (2006.01)
    *G06F 119/18*    (2020.01)

(58) Field of Classification Search
    USPC .............................................. 430/302; 703/1
    See application file for complete search history.

(56) References Cited

U.S. PATENT DOCUMENTS

| | | |
|---|---|---|
| 9,349,604 B2 | 5/2016 | Rathsack et al. |
| 11,030,353 B2 * | 6/2021 | Sato .................. H01L 23/49838 |
| 2015/0006901 A1 | 3/2015 | Watanabe et al. |
| 2015/0108087 A1 | 4/2015 | Somervell et al. |
| 2015/0111386 A1 | 4/2015 | Rathsack et al. |
| 2015/0227676 A1 | 8/2015 | Robles et al. |
| 2016/0260731 A1 | 9/2016 | Nagai et al. |
| 2019/0236237 A1 | 8/2019 | Lai |

\* cited by examiner

<21> ARRAY GUIDE

<30> ARRAY GUIDE

GUIDE LAYOUT CREATING APPARATUS, GUIDE LAYOUT CREATING METHOD AND RECORDING MEDIUM

CROSS REFERENCE TO RELATED APPLICATION

This application is a divisional of U.S. application Ser. No. 15/891,408, filed Feb. 8, 2018, which is based upon and claims the benefit of priority from the prior Japanese Patent Application No. 2017-176080, filed Sep. 13, 2017, the entire contents of both of which are incorporated herein by reference.

FIELD

Embodiments described herein relate to a guide layout creating apparatus, a guide layout creating method and a recording medium.

BACKGROUND

When a desired array of a hexagonal close-packed pattern is to be formed by directed self-assembly (DSA) lithography, block copolymers (BCPs) are arrayed in this array by a chemical guide or a physical guide. There is a need to selectively form the desired array of the hexagonal close-packed pattern.

DETAILED DESCRIPTION

Embodiments will now be explained with reference to the accompanying drawings.

In one embodiment, a guide layout creating apparatus includes a selection module that selects a first point as a point on which a guide to array a plurality of particles in a first array is arranged. The apparatus further includes a calculation module that calculates first free energy when the plurality of particles are arrayed in the first array by the guide arranged on the first point, and second free energy when the plurality of particles are arrayed in a second array by the guide arranged on the first point, a type of the second array being different from a type of the first array. The apparatus further includes a determination module that determines whether the first point is employed as the point on which the guide is arranged on the basis of the first free energy and the second free energy.

First Embodiment (1) Premises of Guide Layout Creating Method in First Embodiment FIGS. 1A to 3B are plan views and a graph for explaining a guide layout creating method in a first embodiment.

Figure 1A:
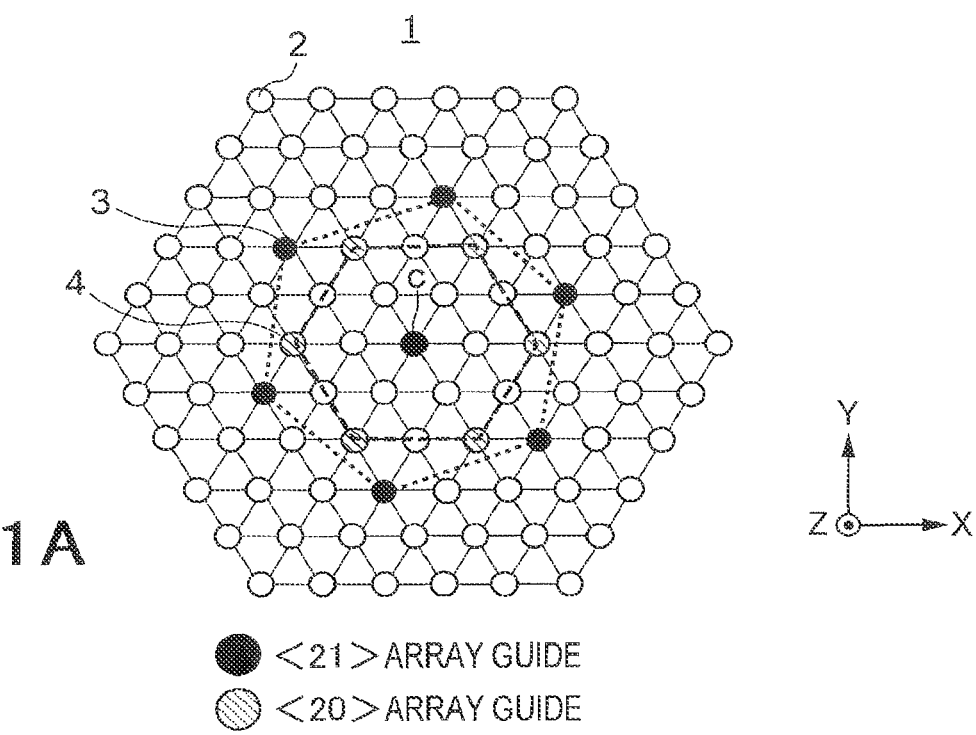
FIGS. 1A and 1B are plan views for explaining a guide layout creating method of a first embodiment.

FIG. 1A illustrates an example in which 21> array guides 3 are arranged on a substrate 1, and a hexagonal close-packed pattern of a BCP is formed by DSA lithography. Reference numeral 2 denotes a lattice point on which the BCP is arrayed. The example of the <21> array guide 3 is a chemical guide or a physical guide arranged on the substrate 1. FIG. 1A illustrates an X-direction and a Y-direction in parallel with a surface of the substrate 1 and perpendicular to each other and a Z-direction perpendicular to the surface of the substrate 1. Hereinafter, the <21> array guide 3 is abbreviated as the guide 3 as appropriate.

The <21> array guide 3 is a guide for arraying the BCP in the <21> array and is cyclically arranged at a certain interval on the substrate 1. FIG. 1A illustrates only 7 guides 3 in a large number of guides 3 for convenience. Reference character "c" denotes a center point of these seven guides 3.

Figure 1B:
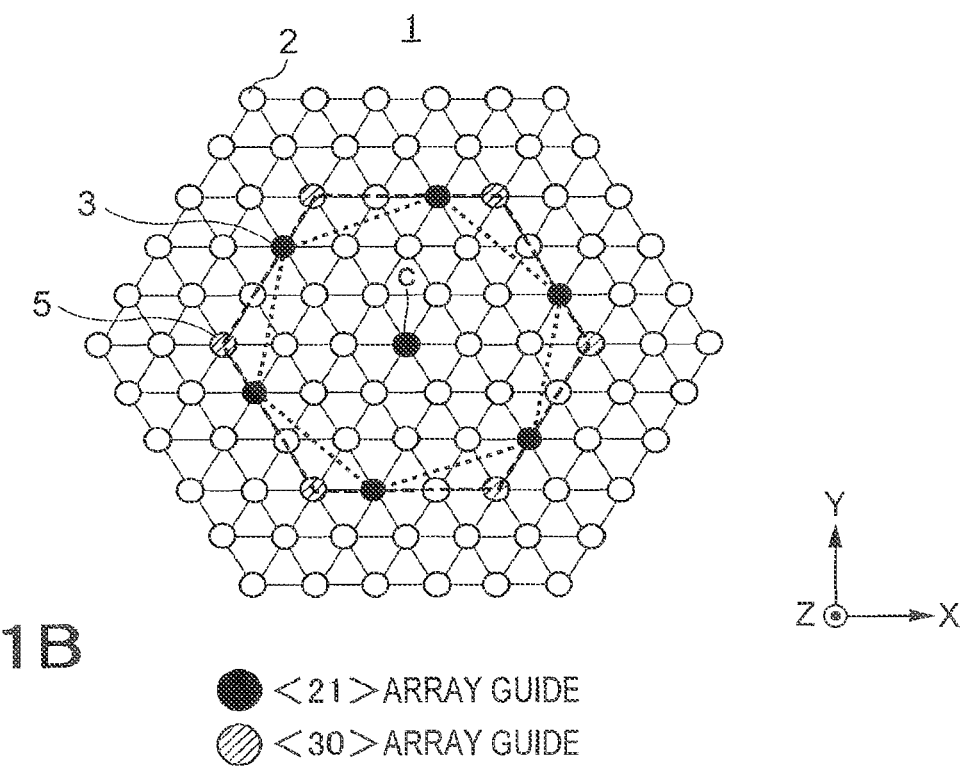

FIG. 1A illustrates a positional relationship between the <21> array guides 3 and <20> array guides 4 when the <20> array guides 4 are arranged on the substrate 1, for example. Similarly, FIG. 1B illustrates a positional relationship between the <21> array guides 3 and <30> array guides 5 when the <30> array guides 5 are arranged on the substrate 1, for example. The <21> array of the BCP is illustrated as a lattice point 6 in FIG. 3A which will be described later.

Hereinafter, the <20> array and the <30> array of the BCP will be described.

When a desired array or a hexagonal close-packed pattern of the <21> array, for example, is to be formed by the DSA lithography, the BCP is arrayed in the <21> array by the <21> array guide 3. As a result, a crystal orientation of the BCP is controlled, and the hexagonal close-packed pattern of the <21> array is formed. However, since the BCP which is a polymer has elasticity, the <21> array pattern and another array pattern might be formed at the same time on the substrate 1. In this case, it becomes impossible to selectively form only the <21> array pattern.

For example, as illustrated in FIG. 1A, a hexagon connecting the <20> array guides 4 is physically separated away from a hexagon connecting the <21> array guides 3 to such a degree that it is contained inside the hexagon connecting the <21> array guides 3. Therefore, a probability that the BCP contracts or extends and forms the patterns of the <21> array and the <20> array at the same time is low, and the <21> array pattern can be selectively formed.

On the other hand, as illustrated in FIG. 1B, the hexagon connecting the <30> array guides 5 has substantially the same size as the hexagon connecting the <21> array guides 3 and is physically close to the hexagon connecting the <21> array guides 3. Therefore, a probability that the BCP contracts or extends and forms the patterns of the <21> array and the <30> array at the same time is high, and it becomes difficult to selectively form the <21> array pattern.

Figure 2:
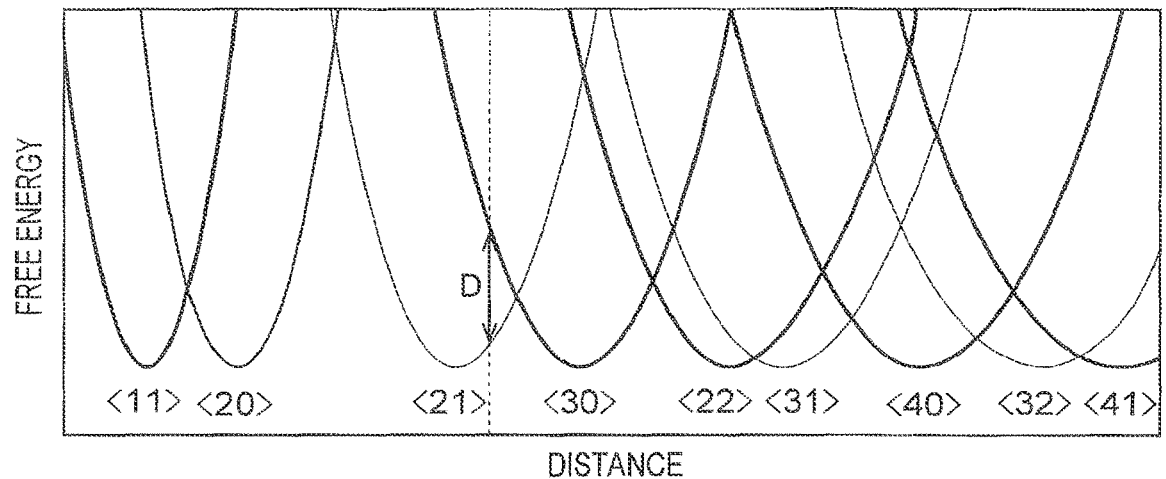
FIG. 2 is a graph for explaining the guide layout creating method of the first embodiment.

This phenomenon can be explained by comparison of free energy. As illustrated in FIG. 2, free energy in the <21> array and the <20> array are not overlapped much, and the both arrays have a relationship of being far from each other in terms of free energy, Therefore, the patterns of the both arrays are not formed easily at the same time. On the other hand, the free energy in the <21> array and the <30> array are overlapped much, and the both arrays have a relationship of being close to each other in terms of the free energy, Therefore, the patterns of the both arrays are formed easily at the same time.

As described above, it is found that, in order to selectively form only the <21> array pattern, a free energy difference between the <21> array and the <30> array need to be increased, and the probability of creating the <30> array needs to be reduced. Reference character "D" illustrated in FIG. 2 indicates this free energy difference.

In the actual DSA lithography, though the <21> array guides 3 are arranged on the substrate 1, such a phenomenon is found that not only the <21> array pattern but also the <30> array pattern is formed on the substrate 1. In this case, since a plurality of areas (grains) having these arrays is observed in rotation, this will be called a crystal orientation rotation defect below.

Figure 3A:
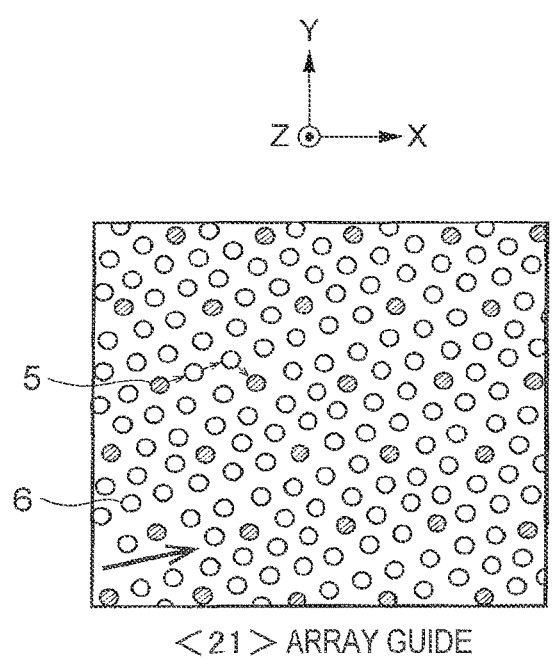
FIGS. 3A and 3B are plan views for explaining the guide layout creating method of the first embodiment.

FIG. 3A illustrates an example in which the <21> array pattern is formed on the substrate 1 when the <30> array guides 5 are arranged on the substrate 1. Reference numeral 6 denotes a lattice point (<21> array) where the BCP is arrayed in this case.

Figure 3B:
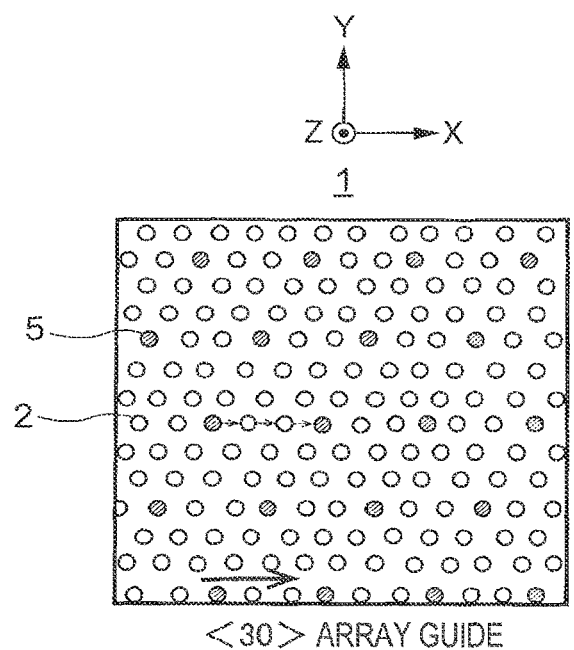

FIG. 3B illustrates an example in which the <30> array pattern is formed on the substrate 1 when the <30> array guides 5 are arranged on the substrate 1. Reference numeral 2 denotes a lattice point (<30> array) where the BCP is arrayed in this case.

When a crystal orientation rotation defect occurs, the pattern in FIG. 3A and the pattern in FIG. 3B are shown on the substrate 1 at the same time.

(2) Details of Guide Layout Creating Method in First Embodiment

Figure 4:
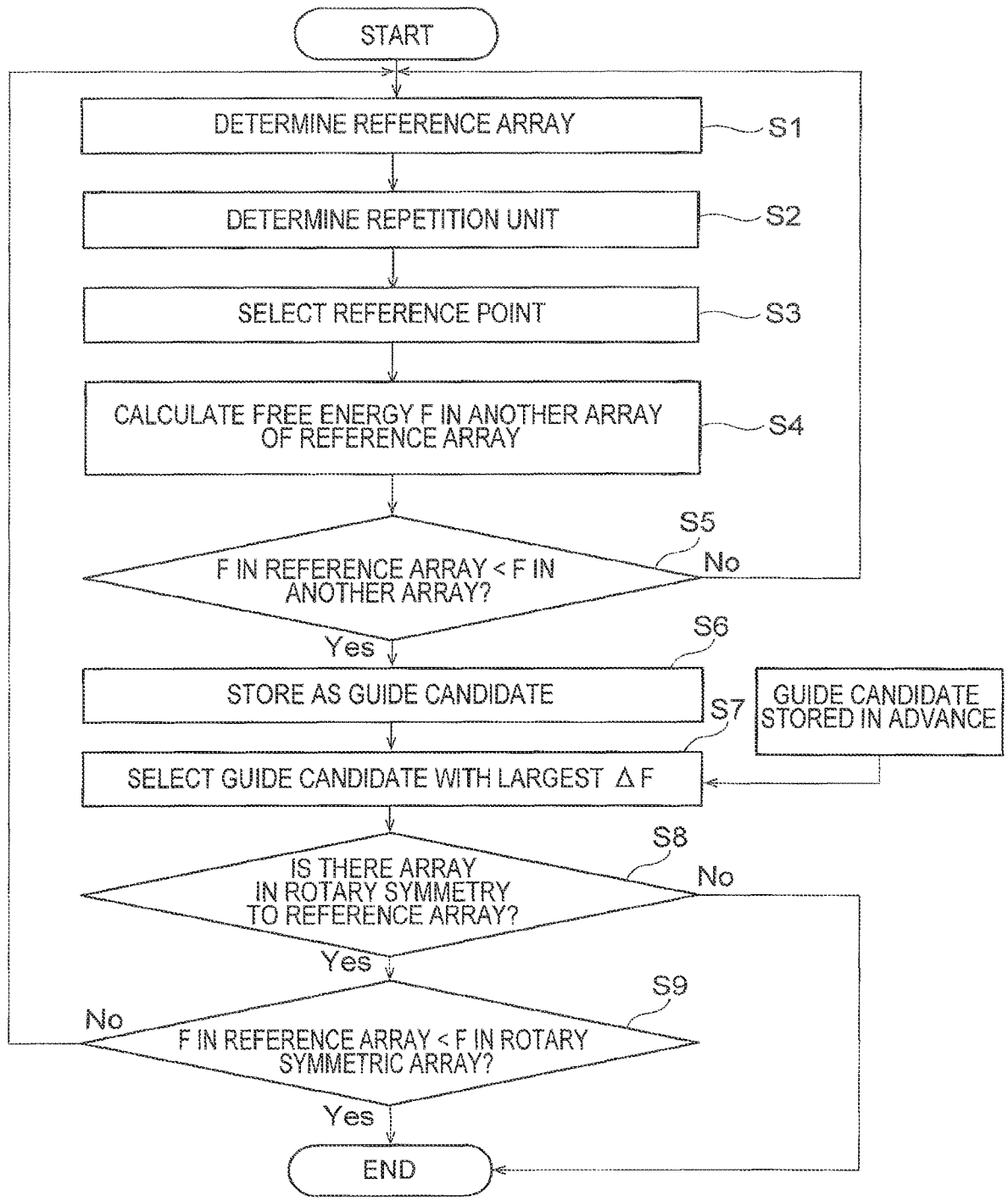
FIG. 4 is a flowchart for explaining the guide layout creating method of the first embodiment.

FIG. 4 is a flowchart for explaining the guide layout creating method in the first embodiment. FIGS. 5 to 10B are views for complementing the explanation of the flowchart in FIG. 4.

The guide layout creating method in FIG. 4 is carried out by using an information processing apparatus such as a personal computer, a work station and the like. Hereinafter, this method will be described by referring also to FIGS. 5 to 10B. The substrate 1, the <21> array guide 3, the lattice point 6 and the like illustrated in FIGS. 5 to 10B represent data indicating the substrate 1, the <21> array guide 3, the lattice point 6 and the like in the information processing apparatus in more accurate terms.

Figure 5:
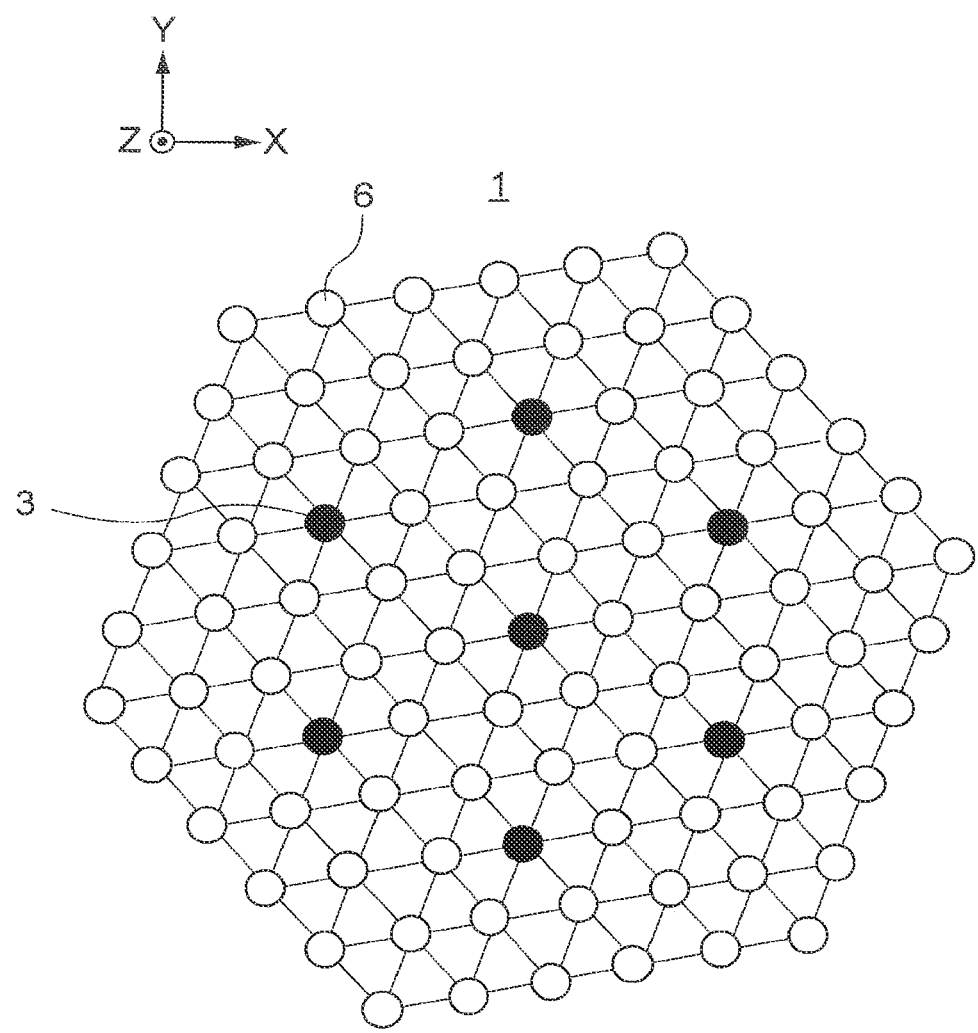
FIGS. 5 to 10B are views for complementing the explanation of the flowchart in FIG. 4.

When an operator wants to examine formation of a desired array or a hexagonal close-packed pattern of the <21> array, for example, by the DSA lithography, the operator of the information processing apparatus inputs an operation for using the <21> array as a reference array. As a result, the reference array is determined to be the <21> array in the information processing apparatus (Step S1). FIG. 5 illustrates an example of the <21> array guides 3 and the lattice points 6 in the <21> array. The operator inputs the reference array in accordance with what times of a pitch a pattern is to be created. Here, in order to form a guide with ArF immersion exposure, formation of a pattern of the <21> array with a triple pitch is targeted. The <21> array is an example of a first array.

Figure 6:
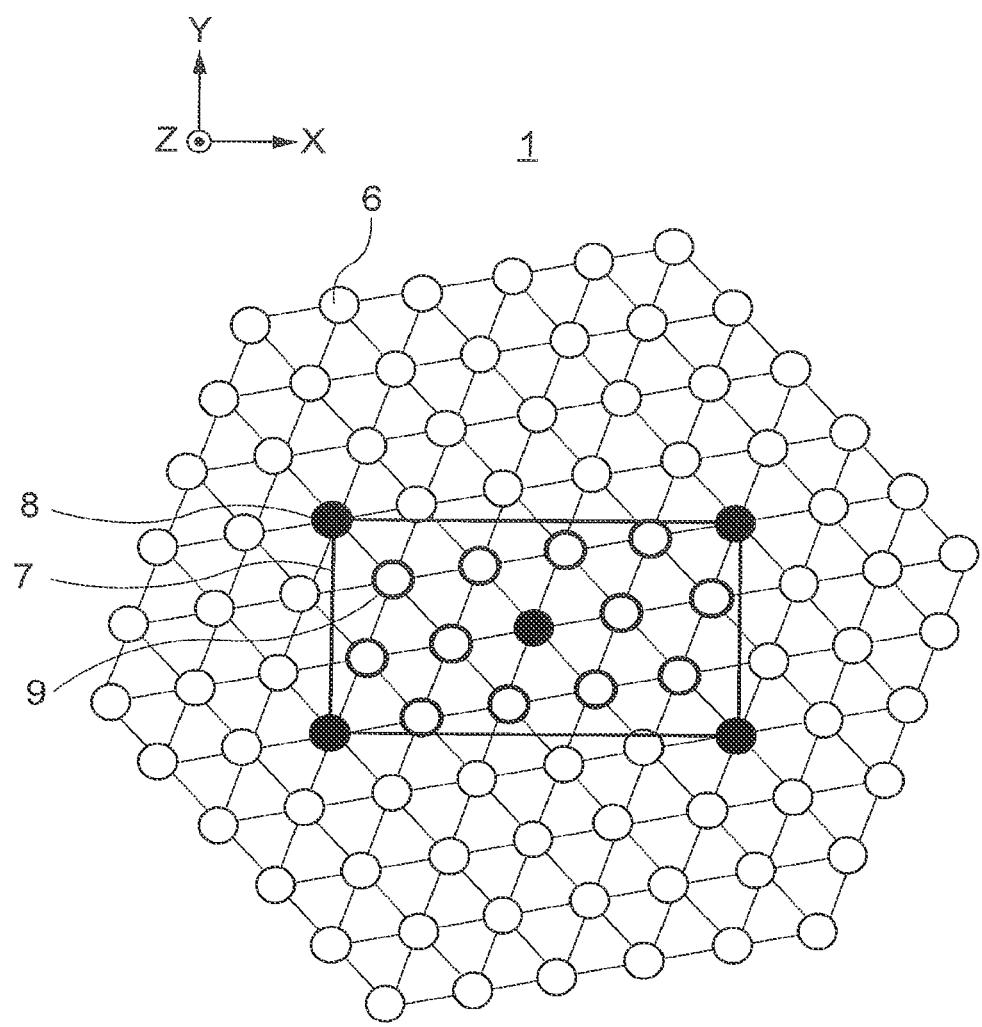

Then, the operator inputs a reference region 7 on the substrate 1 and one or more reference points 8 in the reference region 7. As a result, the reference region 7 is selected in the information processing apparatus, and the reference point 8 is selected (Steps S2, S3), FIG. 6 illustrates the reference region 7 including 17 lattice points 6 and the five lattice points 6 selected as the reference points 8. Reference numeral 9 denotes 12 lattice points 6 not selected as the reference points 8. The reference region 7 is an example of a first region, and the reference point 8 is an example of a first point. A functional block executing processing at Steps S2 and S3 is an example of a selection module.

The reference point 8 is a point where the <21> array guide 3 for arraying the BCP in the <21> array (reference array) is to be arranged. The reference region 7 is a region for determining a repetition unit of the arrangement of these <21> array guides 3. The arrangement of the <21> array guide 3 in this embodiment is determined by applying a cyclic boundary condition to the reference region 7. The <21> array guide 3 may be a chemical guide or a physical guide. The BCP is an example of a plurality of particles.

A shape and a size of the reference region 7 may be set in any way. Moreover, the number and positions of the reference points 8 may be set in any way. Furthermore, instead of selecting the reference point 8 on the basis of the input operation by the operator, the information processing apparatus may automatically select an arbitrary number of reference points 8 from the lattice points 6 in the reference region 7 at random.

Figure 7A:
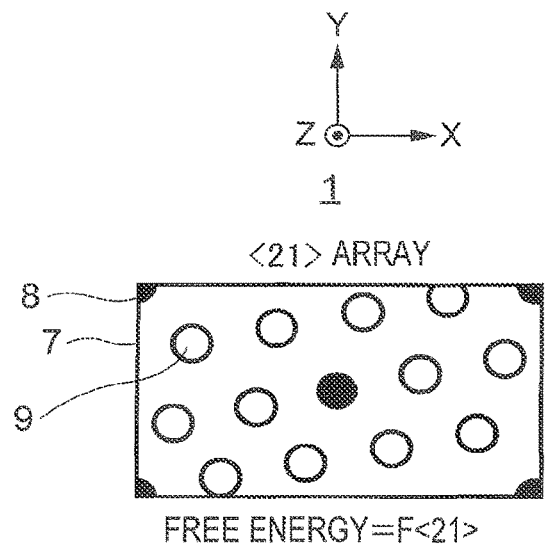

Then, the free energy when the BCP are arrayed in the <21> array by the <21> array guides 3 arranged on the reference points 8 is calculated (Step S4). FIG. 7A illustrates the lattice points 9 at which the BCP are arrayed in the <21> array. The free energy F<21> in this <21> array is an example of first free energy.

Figure 7B:
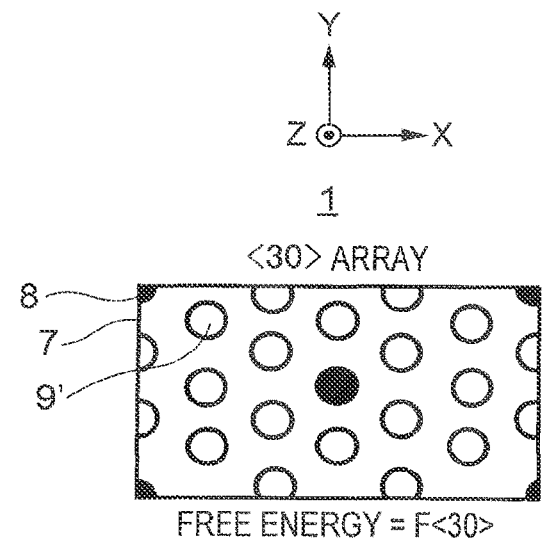

Moreover, the free energy when the BCP are arrayed in another array by the <21> array guides 3 arranged on the reference points 8 is calculated (Step S4). FIG. 7B illustrates lattice points 9' at which the BCP are arrayed in the <30> array. The <30> array is an example of a second array of a type different from the first array, and the free energy F<30> in this <30> array is an example of second free energy. The functional block for executing processing at Step S4 is an example of a calculation module.

Then, the free energy F<21> is compared with the free energy F<30> (Step S5). Then, if F<21> is lower than F<30>, the <21> array guides 3 arranged on the reference points 8 are stored as guide candidates in the information processing apparatus (Step S6). That is, the arrangement of the five reference points 8 illustrated in FIG. 6 is stored as the guide candidates.

Figure 8:
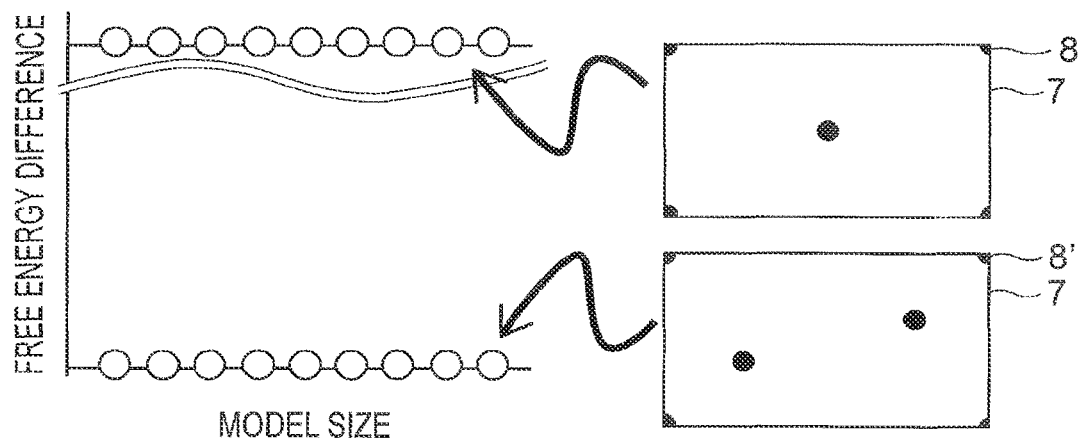

In this embodiment, the processing at Steps S1 to S6 is repeatedly executed by changing the arrangement of the reference points 8. FIG. 8 illustrates the arrangement of the five reference points 8 illustrated in FIG. 6 and the arrangement of six reference points 8' different from that as examples of such arrangement. By means of Steps S1 to S6, various guide candidates are stored in the information processing apparatus.

At Step S7, a free energy difference ΔF between the reference array and another array of each guide candidate is calculated, and the guide candidate with the largest free energy difference ΔF is selected, FIG. 8 illustrates that the ΔF (=F<30>−F<21>) of the guide candidate made of the five reference points 8 is larger than the ΔF (=F<30>−F<21>) of the guide candidate made of the six reference points 8'. In this case, if the guide candidate is only these two, the guide candidate made of the five reference points 8 are selected as the guide candidate with the largest ΔF. The reference point 8' is an example of a second point. The F<21> and the F<30> of the guide candidate made of the reference points 8' are examples of third and fourth free energy, respectively. ΔF of the reference point 8 is an example of a first difference and ΔF of the reference point 8' is an example of a second difference.

As described above, whether or not the reference points 8 are employed or whether or not the reference points 8' are employed as the points on which the <21> array guides 3 are arranged is determined. In this embodiment, since the ΔF of the guide candidate made of the reference points 8 is the largest, it is determined that the reference points 8 are employed as the points on which the <21> array guides 3 are arranged. As is obvious from Steps S5, S6, in order for the guide candidate made of the reference points 8 to be employed, its ΔF should be positive as a condition (ΔF>0), The functional block for executing the processing at Step S7 is an example of a determination module.

However, in this embodiment, in order to determine whether or not the reference points 8 are employed, processing at Steps S8 and S9 is further executed. The processing at Steps S8 and S9 will be described below.

Figure 9:
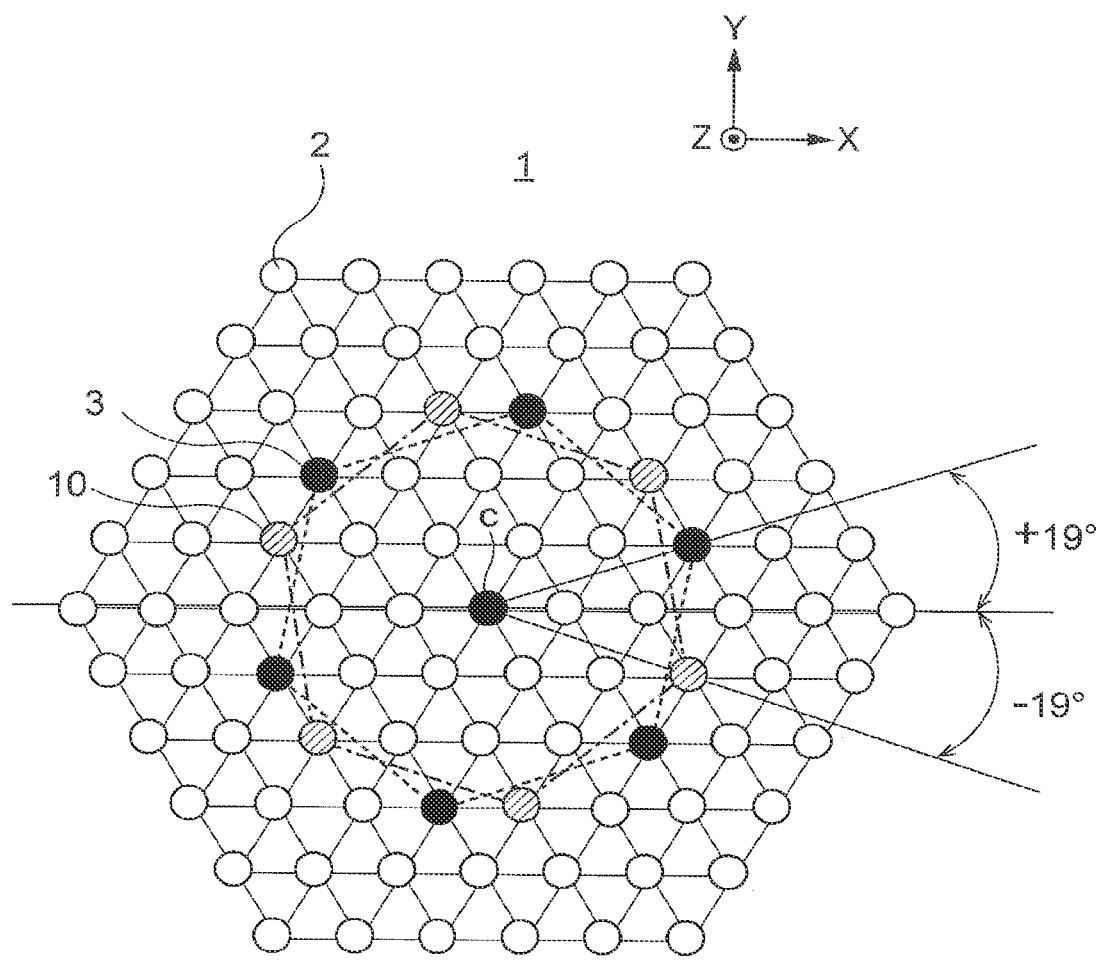

When the guide candidate made of the reference points 8 is selected at Step S7, it is determined whether or not there is an array which is rotary symmetric to the aforementioned <21> array (Step S8). In this embodiment, there is such a rotary symmetric array. FIG. 9 illustrates the <21> array guide 3 for arraying the BCP in the aforementioned <21> array and a rotary symmetric array guide 10 for arraying the BCP in its rotary symmetric array. The rotary symmetric array is an example of a third array.

Figure 10A:
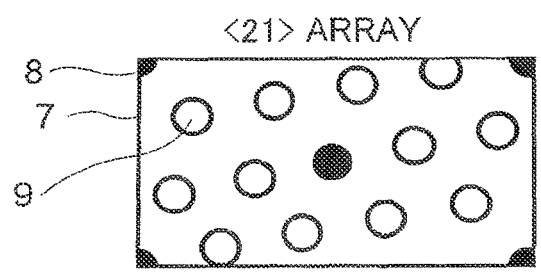

When there is a rotary symmetric array, free energy when the BCP are arrayed in the <21> array by the <21> array guides 3 arranged on the reference points 8 is calculated. FIG. 10A illustrates lattice points 9 where the BCP are arrayed in the <21> array. The free energy in this <21> array is an example of the first free energy. For this free energy, that calculated at Step S4 may be used as it is.

Figure 10B:
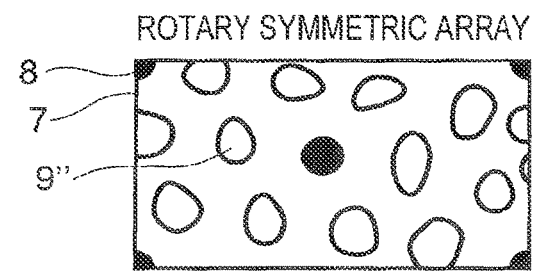

Moreover, free energy when the BCP are arrayed in the rotary symmetric array by the <21> array guides 3 arranged on the reference points 8 is calculated. FIG. 10B illustrates lattice points 9" on which the BCP are arrayed in the rotary symmetric array. The free energy in this rotary symmetric array is an example of fifth free energy. Distortion in a shape of the lattice point 9" illustrated in FIG. 10B represents distortion in a shape of the BCP arrayed on the lattice point 9", Here, detailed description of this distortion will be omitted.

Next, the free energy in the <21> array is compared with that of the rotary symmetric array (Step S9). If the free energy in the <21> array is lower than the free energy in the rotary symmetric array, the <21> array guides 3 arranged on the reference points 8 are stored as employed arrangement of the guides in the information processing apparatus. That is, the arrangement of the five reference points 8 illustrated in FIG. 6 is stored as the employed arrangement of the guides.

As described above, whether or not the reference points 8 illustrated in FIG. 6 are employed as the points on which the <21> array guides 3 are arranged is determined. In this embodiment, since the free energy in the <21> array is lower than the free energy in the rotary symmetric array, employment of the reference points 8 illustrated in FIG. 6 as the points on which the <21> array guides 3 are arranged is determined. As is obvious from Steps S8, S9, in order for the guide candidate made of the reference points 8 to be employed, the free energy in the <21> array should be lower than the free energy in the rotary symmetric array as a condition. The functional blocks for executing the processing at Steps S8 and S9 are also examples of the calculation module and the determination module.

The information processing apparatus outputs a determination result of the arrangement of the <21> array guide 3. For example, the determination result may be displayed on a screen of the information processing apparatus or the determination result may be stored in the information processing apparatus. The information processing apparatus may transmit the determination result of the arrangement of the <21> array guide 3 to another apparatus.

As described above, in this embodiment, the points on which the <21> array guides 3 are arranged are determined on the basis of the free energy in the <21> array and the free energy in another array. For example, in this embodiment, the points on which the <21> array guides 3 are arranged are determined so that a difference obtained by subtracting the free energy in another array from the free energy in the <21> array becomes the largest.

As described above, according to this embodiment, a guide layout for selectively forming a hexagonal close-packed pattern of a desired array (<21> array) can be created. Moreover, according to this embodiment, such a guide layout can be created by considering rotary symmetricity of the array.

In this embodiment, when each array is noted as an <ij> array, a notation in which i>0 and j>0 is employed.

Second Embodiment

Figure 11:
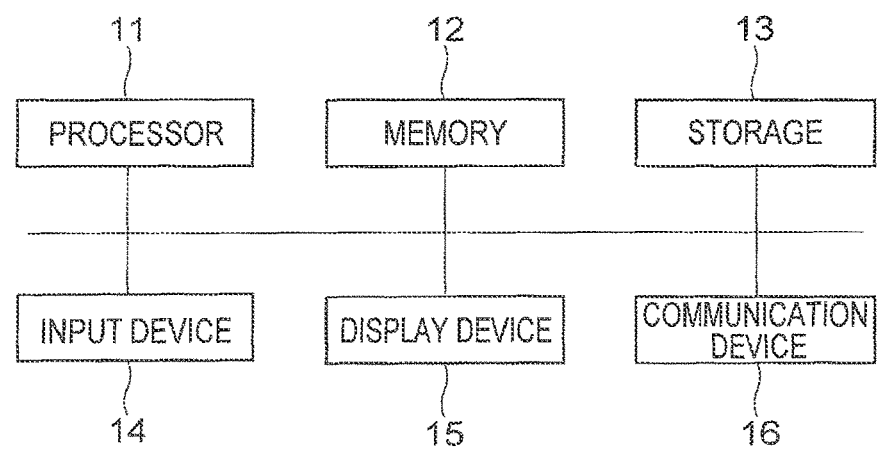
FIG. 11 is a block diagram illustrating a constitution of a guide layout creating apparatus in a second embodiment.

FIG. 11 is a block diagram illustrating a constitution of a guide layout creating apparatus of a second embodiment.

The guide layout creating apparatus in FIG. 11 includes a processor 11 such as a CPU (central processing unit) or the like, a memory 12 such as a RAM (random access memory) and a ROM (read only memory) or the like, and a storage 13 such as an HDD (hard disc drive) or the like.

The guide layout creating apparatus in FIG. 11 further includes an input device 14 such as a mouse, a keyboard or the like, a display device 15 such as an LCD (liquid crystal display) monitor or the like, and a communication device 16 such as a LAN (local area network) board or the like.

In this embodiment, a guide layout creating program for having the guide layout creating method in the first embodiment executed by a computer is installed in the storage 13. The guide layout creating apparatus extends this program in the memory 12 (RAM) and has it executed by the processor 11. Data created by this guide layout creating method is temporarily held in the memory 12 (RAM) or stored and held in the storage 13.

The guide layout creating program can be installed by attaching an external apparatus which records this program to the guide layout creating apparatus and by storing this program in the storage 13 from the external apparatus. Examples of the external apparatus are a computer-readable recording medium and a recording device incorporating such recording medium. Examples of the recording medium are a CD-ROM and a DVD-ROM and an example of the recording device is an HDD. The guide layout creating program can be installed by downloading this program through the communication device 16.

According to this embodiment, the guide layout creating method of the first embodiment can be realized by software.

While certain embodiments have been described, these embodiments have been presented by way of example only, and are not intended to limit the scope of the inventions. Indeed, the novel apparatuses, methods and media described herein may be embodied in a variety of other forms; furthermore, various omissions, substitutions and changes in the form of the apparatuses, methods and media described herein may be made without departing from the spirit of the inventions. The accompanying claims and their equivalents are intended to cover such forms or modifications as would fall within the scope and spirit of the inventions.

The invention claimed is:

1. A guide layout creating apparatus comprising:
   a selection module that selects a first point as a point on which a guide to array a plurality of particles in a first array is arranged;
   a calculation module that calculates first free energy when the plurality of particles are arrayed in the first array by the guide arranged on the first point, and second free energy when the plurality of particles are arrayed in a second array by the guide arranged on the first point, a type of the second array being different from a type of the first array; and
   a determination module that determines whether the first point is employed as the point on which the guide is arranged on the basis of the first free energy and the second free energy.

2. The apparatus of claim 1, wherein the determination module determines to employ the first point as the point on which the guide is arranged on a condition that the first free energy is lower than the second free energy.

3. The apparatus of claim 1, wherein patterns of the first and second arrays are hexagonal close-packed patterns.

4. The apparatus of claim 1, wherein the guide is a chemical guide or a physical guide.

5. The apparatus of claim 1, wherein
   the selection module selects a second point as a point on which the guide is arranged;
   the calculation module calculates third free energy when the plurality of particles are arrayed in the first array by the guide arranged on the second point, and fourth free energy when the plurality of particles are arrayed in the second array by the guide arranged on the second point; and
   the determination module determines to employ the first point as the point on which the guide is arranged when a first difference obtained by subtracting the first free energy from the second free energy is larger than a second difference obtained by subtracting the third free energy from the fourth free energy.

6. The apparatus of claim 1, wherein the selection module automatically selects the first point at random.

7. The apparatus of claim 1, wherein the selection module selects a first region as a repetition unit of arrangement of the guide, and selects the first point in the first region.

8. The apparatus of claim 1, wherein
   the calculation module calculates fifth free energy when the plurality of particles are arrayed in a third array in rotary symmetry to the first array by the guide arranged on the first point; and
   the determination module determines whether or not the first point is employed as the point on which the guide is arranged on the basis of the first free energy and the fifth free energy.

9. The apparatus of claim 8, wherein the determination module determines to employ the first point as the point on which the guide is arranged on a condition that the first free energy is lower than the fifth free energy.

* * * * *